United States Patent
Jain et al.

(10) Patent No.: US 10,397,353 B2
(45) Date of Patent: Aug. 27, 2019

(54) CONTEXT ENRICHED DISTRIBUTED LOGGING SERVICES FOR WORKLOADS IN A DATACENTER

(71) Applicant: Nicira, Inc., Palo Alto, CA (US)

(72) Inventors: Jayant Jain, Cupertino, CA (US); Anirban Sengupta, Saratoga, CA (US); Mayank Agarwal, Kirkland, WA (US); Raju Koganty, San Jose, CA (US); Chidambareswaran Raman, Sunnyvale, CA (US); Nishant Jain, Cupertino, CA (US); Jeremy Olmsted-Thompson, New York, NY (US); Srinivas Nimmagadda, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 374 days.

(21) Appl. No.: 14/996,172

(22) Filed: Jan. 14, 2016

(65) Prior Publication Data
US 2017/0099365 A1    Apr. 6, 2017

Related U.S. Application Data

(60) Provisional application No. 62/235,622, filed on Oct. 1, 2015.

(51) Int. Cl.
*H04L 12/24*    (2006.01)
*H04L 29/06*    (2006.01)
*H04L 29/08*    (2006.01)

(52) U.S. Cl.
CPC ........ *H04L 67/2804* (2013.01); *H04L 41/069* (2013.01); *H04L 67/1095* (2013.01); *H04L 67/2852* (2013.01); *H04L 67/327* (2013.01); *H04L 41/0686* (2013.01); *H04L 63/0428* (2013.01)

(58) Field of Classification Search
CPC ............. H04L 67/2804; H04L 67/1095; H04L 67/2852; H04L 67/327; H04L 41/069; H04L 41/0686; H04L 63/042
See application file for complete search history.

(56) References Cited

U.S. PATENT DOCUMENTS

| 2007/0203708 | A1* | 8/2007 | Polcyn | H04M 3/42221 704/270.1 |
| 2007/0271371 | A1* | 11/2007 | Singh Ahuja | H04L 43/18 709/224 |

(Continued)

*Primary Examiner* — Azizul Choudhury
(74) *Attorney, Agent, or Firm* — Adeli LLP (57) ABSTRACT

A method of enhancing log packets with context metadata is provided. The method at a redirecting filter on a host in a datacenter, intercepts a packet from a data compute node (DCN) of a datacenter tenant. The method determines that the intercepted packet is a log packet. The method forwards the log packet and a first set of associated context metadata to a proxy logging server. The first set of context metadata is associated with the log packet based on the DCN that generated the packet. The method, at the proxy logging server, associates a second set of context metadata with the log packet. The second set of context metadata is received from a compute manager of the datacenter. The method sending the log packet and the first and second sets of context metadata from the proxy logging server to a central logging server associated with the tenant.

21 Claims, 10 Drawing Sheets

(56) References Cited

U.S. PATENT DOCUMENTS

| | | | | |
|---|---|---|---|---|
| 2013/0152088 A1* | 6/2013 | Gkantsidis | ........ | G06F 17/30386 |
| | | | | 718/100 |
| 2014/0052877 A1* | 2/2014 | Mao | ..................... | H04L 61/103 |
| | | | | 709/245 |
| 2014/0280884 A1* | 9/2014 | Searle | ................. | H04L 43/0864 |
| | | | | 709/224 |
| 2015/0081863 A1* | 3/2015 | Garg | ....................... | H04L 41/00 |
| | | | | 709/223 |

* cited by examiner

CONTEXT ENRICHED DISTRIBUTED LOGGING SERVICES FOR WORKLOADS IN A DATACENTER

CLAIM OF BENEFIT TO PRIOR APPLICATIONS

This application claims the benefit of U.S. Provisional Patent Application 62/235,622, filed Oct. 1, 2015. U.S. Provisional Patent Application 62/235,622 is incorporated herein by reference.

BACKGROUND

Administrating a software defined data center (SDDC) requires increased visibility into the operations of individual virtual machines. Log analysis has become a critical tool in the monitoring of datacenter resources such as servers and applications. System logs are an important source of such information, but often do not contain enough identifying information. For instance, clones of virtual machines running on the same host output system log information that contains the exact same machine name identifiers, making it impossible to distinguish which virtual machines the logs are coming from. Other important information in the context of an SDDC is also missing from system log messages. Additionally, managing and configuring the logging preferences of individual virtual machines in a large SDDC can be a difficult task.

Typically logs generated by servers and applications are sent to a central logging server, which has been pre-configured to analyze logs received from these servers and applications. The context encoded in the logs such as facility, level, server application name and identification, instance, etc., which play a significant part in analyzing and classifying these logs, are typically attached by the application or the server that generates the log. The logs are then sent over a transport protocol such as UDP which is lossy, or TCP which is fairly resource consuming but loss less, to the pre-configured log server. As the datacenter operation deploys multiple applications and servers, these applications and servers could have varying configuration and logging context metadata, and be programmed with different log server destinations.

From a datacenter's operation point of view, these logs have only the context that the application or the server has encoded. There is no other information attached to the logs, apart from the network address on the log packets that the datacenter operator can correlate. In the event of a misconfiguration on the application or the server, all the logs from that application or server could be lost.

The existing log services correlate data only after the logs are received by the log servers in the raw format as sent by the application or server that generated the logs. There is currently no mechanism to embellish the log data from the source itself in an agentless form so as to provide more context to the log server. The existing log services focus more on processing a large amount of data using large data infrastructure and applying load balancers to consume the received data, rather than making the data itself more context rich so as to avoid a lot of the post processing for data correlation.

BRIEF SUMMARY

Some embodiments provide a distributed logging service that intercepts system log (syslog) packets from all virtual machines running on a host in a datacenter. The logging service augments the syslog packets with additional metadata acquired from the host and the data center's central compute manager and reroutes the syslog packets to a centralized syslog server. The distributed logging service enables centralized management of logging preferences and allows a new centralized syslog server to be easily configured for all virtual machines running on a host, without individually modifying the preferences of each virtual machine.

In some embodiments a redirecting filter intercepts the log packets sent by each tenant virtual machine. For instance, the redirecting filter intercepts the packets sent to a logging port such as syslog port. The redirecting filter identifies a set of context metadata for each log packet and redirect or copies the log packet and the identified metadata to a proxy logging server.

The proxy logging server in some embodiments is a service virtual machine that is located either on the same host as the filter or on a different host on the network. In other embodiments, the proxy logging server is a process that runs on the same host as the filter. The proxy logging server identifies further context metadata for the log packets. For instance, the proxy logging server in some embodiments gets context metadata directly from the host where the virtual machine that generated the log is hosted.

The proxy logging server also utilizes context metadata received from the datacenter compute manager. The proxy logging server in some embodiments caches the context metadata received form the datacenter compute manager to use for other log packets received from the virtual machines. The proxy logging server associates the metadata received form different sources to the log packets. The proxy logging server compresses and encrypts the log data and periodically sends the logs in the form of one or more log messages to a central logging server.

Some embodiments redact the sensitive information from the logs before the log messages leave the host. In some embodiments, different types of context are added to the log messages based on different log levels/types (e.g., error or debug) present in the log message. For instance, if the a log message is related to an error condition, the log can be verbose and provide critical context such as processor, memory, disk space, etc. On the other hand, a log message related to debugging may have different context that is appropriate for debugging purposes.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Logging servers provided in prior art receive logs in raw format. Any context metadata included in these logs is attached by the servers or applications that generate the logs. As the datacenter deploys multiple applications and servers, these applications and servers could have varying configuration, logging context metadata, and programmed with different logging server destinations. As such there is no uniform way of adding context and metadata to the logs.

Figure 1:
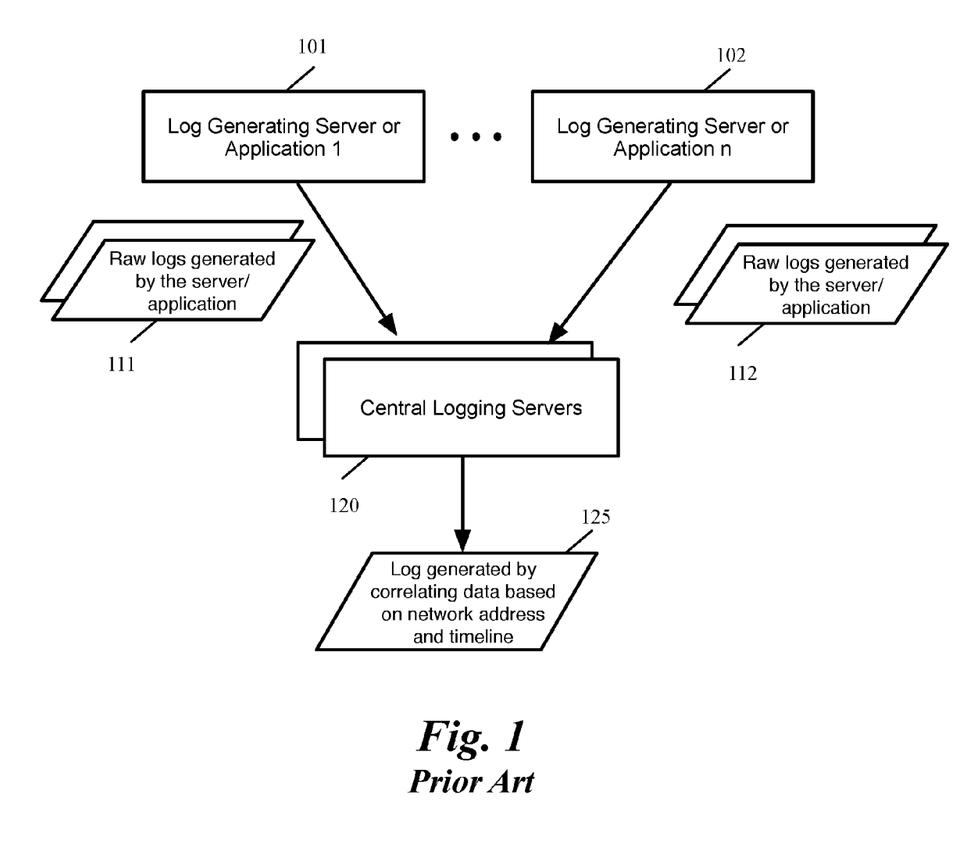
FIG. 1 illustrates a logging service according to prior art.

FIG. 1 illustrates a logging service according to prior art. As shown, several servers or applications 101-102 generate logs. Each server or application 101-102 that generates logs acts as an agent that adds metadata based on the particular server or application configuration.

The logs 111-112 are sent to a set of central logging servers 120. The central logging servers 120 typically apply load balancing to process the large amount of data in the logs 111-112. Data correlation on the logs is done only after the logs are received by the logging servers in raw format. There is no other information attached to the logs, apart from the network address on the log packets and the logs' timestamps, which the logging servers (or a datacenter operator) can co-relate to generate logs 125 by correlating data from the raw logs 111-112.

There is no mechanism in the logging service in FIG. 1 to include additional context metadata in an agentless form (i.e., without having each individual server or application that generates the logs to add context metadata to the logs) to avoid post processing by the logging servers 120 for correlating log data.

Another shortcoming in the logging service of FIG. 1 is that, in the event of a misconfiguration on a server or application that generates logs (e.g., to specify a wrong destination to receive the logs), all logs from that server or application could be lost. Yet another shortcoming is that when the system administrator wants to change one of the central logging servers 120 to which many servers and applications are sending their logs, the servers and applications have to be reconfigured to send the logs to the new logging server.

I. Agentless Context Enhanced Distributed Logging Service

Some embodiments provide a filter that intercepts log packets that virtual machines (VMs) send. The filter adds context metadata to the packets and sends them to a proxy log collection service (or proxy logging server) to add further context metadata and send the logs and the associated metadata to an external logging server. As further described below, the proxy logging server in some embodiments is a service VM that is located either on the same host as the filter or on a different host on the network. In other embodiments, the proxy logging server is a process that runs on the same host as the filter.

A. Using a Service VM to Collect Logs and Add Context Metadata to the Logs

Figure 2:
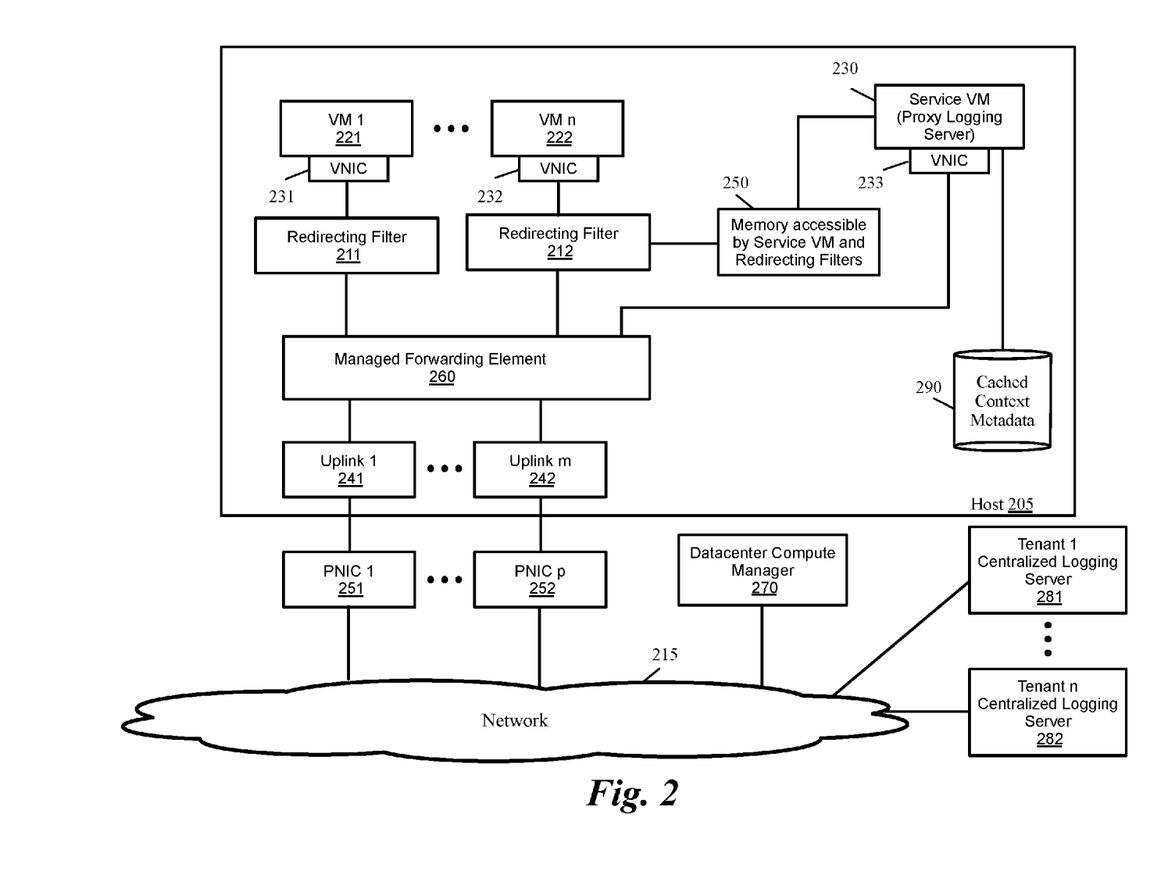
FIG. 2 conceptually illustrates a logging service that uses a filter to intercept packets with log data and sends the packets to a service VM in some embodiments.

FIG. 2 conceptually illustrates a logging service that uses a filter to intercept packets with log data and sends the packets to a service VM in some embodiments. The host 205 is a physical machine that hosts virtual machines (VMs) 221-222 or other data compute nodes for one or more tenants. A VM is a software implementation of a machine such as a computer.

The host in some embodiments includes virtualization software, which is a software abstraction layer that operates on top of the hardware and below any operating system in some embodiments. In some embodiments, the host kernel performs virtualization functionalities (e.g., to virtualize the hardware for the VMs operating on the host machine). The kernel handles various management tasks, such as memory management, processor scheduling, or any other operations for controlling the execution of the VMs operating on the host machine.

In some embodiments, the kernel maintains context metadata for the host and the VMs. For instance, the host in some embodiments maintains processor and memory usage data for each VM as well as processor and memory usage data for the host. As described further below, some embodiments query the metadata maintained by the host through the host kernel and include them as a part of the context metadata that is associated with packets that carry log information.

The host also includes a managed forwarding element (MFE) 260 that operates as a software forwarding element. The MFE performs packet processing operations such as receiving and forwarding packets for the VMs or other data compute nodes that serve as the sources and destinations for packets. For example, the host machine can host VMs for several different logical networks, and the MFE would implement the several logical networks for the VMs residing on the host. As shown, each VM 221-222 communicates with the MFE 260 through an associated virtual network interface card (VNIC) 231-232.

The MFE also sends packets to and receives packets from an external network 215 through uplinks 241-242 and physical network interface cards (PNICs) 251-252. An uplink is a module that relays packets between the MFE 260 and a PNICs in order to perform various packet processing functions on incoming and outgoing traffic.

In some embodiments the MFE implements an overlay network. An overlay network is a network virtualization technology that achieves multi-tenancy in a computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is a Layer 2 (L2) overlay scheme over a Layer 3 (L3) network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 packets over L3 networks.

Some embodiments provide a redirecting filter that intercepts log packets sent by a VM. For instance, the redirecting filter intercepts packets that a VM sends to a logging port (e.g., syslog port). The filter adds context metadata to the packets and sends them to a proxy log collection service (or proxy logging server). As shown, each VM 221-222 has a redirecting filter 211-212 between the VM's VNIC 231-232 and the MFE 260.

The proxy logging server in the embodiment shown in FIG. 2 is a service VM 230. Although the service VM 230 is shown in the host 205, the service VM in some embodiments is located on another host on the network. Different embodiments forward the log packets and the associated metadata from a redirecting filter to the service VM differently. For instance, in some embodiments, the service VM 230 and each of the redirecting filters have access to a common memory. As shown, the redirecting filter 212 and service VM 230 have access to memory 250. In these embodiments, the redirecting filter places the packets that are redirected (or copied) to the service VM in memory 250 and the service VM accesses the packets from memory 250.

In other embodiments, the redirecting filter encapsulates the log packet with an overly network header and includes the context metadata in the encapsulation header. The redirecting filter then sends the encapsulated packet through the MFE 260 to the service VM's VNIC 233 through an overlay network. When the service VM is on the same host as the redirecting filter (as shown), the packets do not leave the host and are delivered to the service VM by the MFE through an overlay tunnel in the host. In the embodiments that the service VM is on a different host, the packets are sent through a tunnel in the network 215, which also implements the overlay network.

The figure further shows several centralized logging servers 281-282 for different tenants. The service VM collects the log packets generated by the VMs of each tenant and the log packets' associated metadata and periodically sends the log packets in bulk (e.g., after a predetermined period of time and/or after a predetermined amount of log is collected) to each tenant's corresponding centralized logging server.

The communication between the service VM 230 and the central logging servers 281-282 in some embodiments is through the MFE 260, one of the uplinks 241-242, one of the PNICs 251-252, and the network 215. In some embodiments, the service VM uses a protocol such as user datagram protocol (UDP) or transmission control protocol (TCP) to send logs to the centralized logging servers.

B. Sources of Context Metadata to Enhance the Logs

There are several sources of metadata that a redirecting filter and the service VM can utilize to add context metadata to the log packets. As shown, each redirecting filter 211-212 is configured to intercept log packets for one of the VMs 221-222. As such, the redirecting filter is aware of certain properties of the corresponding VM and the process that is generating the log. The redirecting filter in some embodiments stores the VM's context metadata as a part of the configuration of the redirecting filter, e.g., in a profile that the redirecting filter maintains.

Figure 3A:
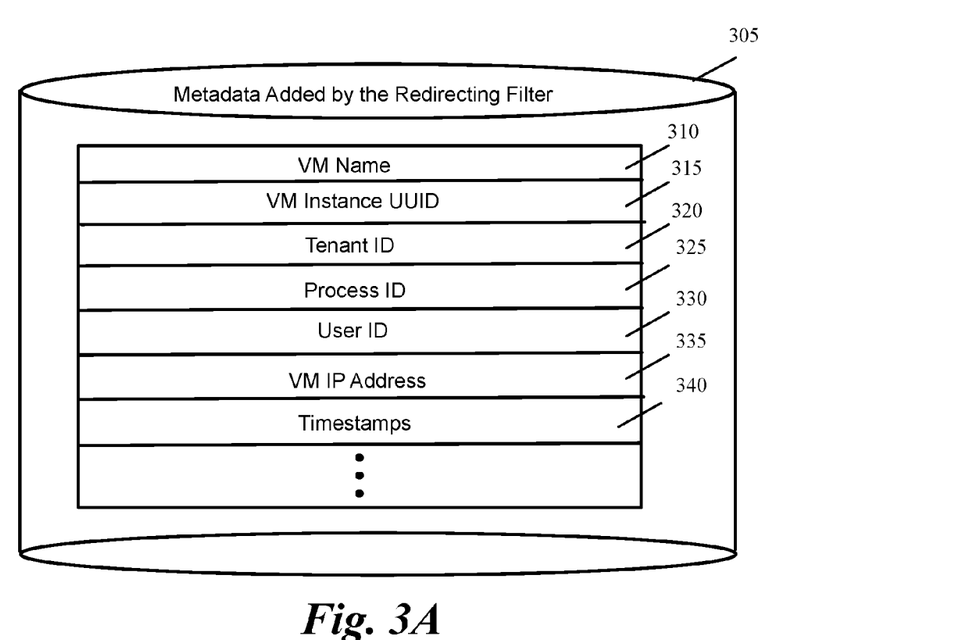
FIG. 3A conceptually illustrates examples of different context metadata that the redirecting filter adds to log packets in some embodiments.

FIG. 3A conceptually illustrates examples of different context metadata 305 that the redirecting filter associates to log packets in some embodiments. As shown, the metadata includes VM name 310, the VM instance's universally unique identifier (UUID) 315, tenant identifier (identification of the tenant that operates the VM that has generated the log packet) 320, identifier of the process that generated the log packet 325, user identifier 330, VM's IP address 335, Timestamp 340 (the time the log is received at the redirecting filter), etc. In some embodiments, when the logging service is configured for a VM, the metadata that identifies these properties is programmed in the profile instance of the logging service and is available to the corresponding filter of the VM. It should be understood that the individual context metadata shown in FIGS. 3A-3C are examples of possible context metadata and the system can be readily expanded to accept additional context metadata.

As described above, the host is also utilized as a source of context metadata to enhance the logs. The host maintains context metadata for the host and the VMs. For instance, the host in some embodiments maintains processor and memory usage data for each VM as well as processor and memory usage for the host. The service VM (or the redirecting filter) in some embodiments queries the metadata maintained by the host through the host kernel. For instance, in some embodiments, the service VM issues a shell command to the kernel to get the metadata directly from the host. The service VM then parses the output of the shell command to identify the metadata.

Figure 3B:
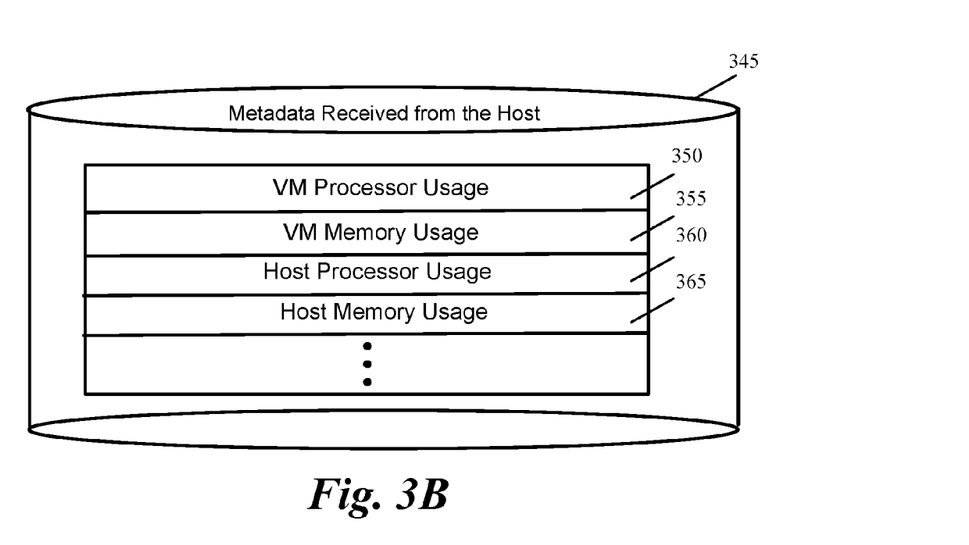
FIG. 3B conceptually illustrates examples of different context metadata that are received from the host in some embodiments.
Figure 3C:
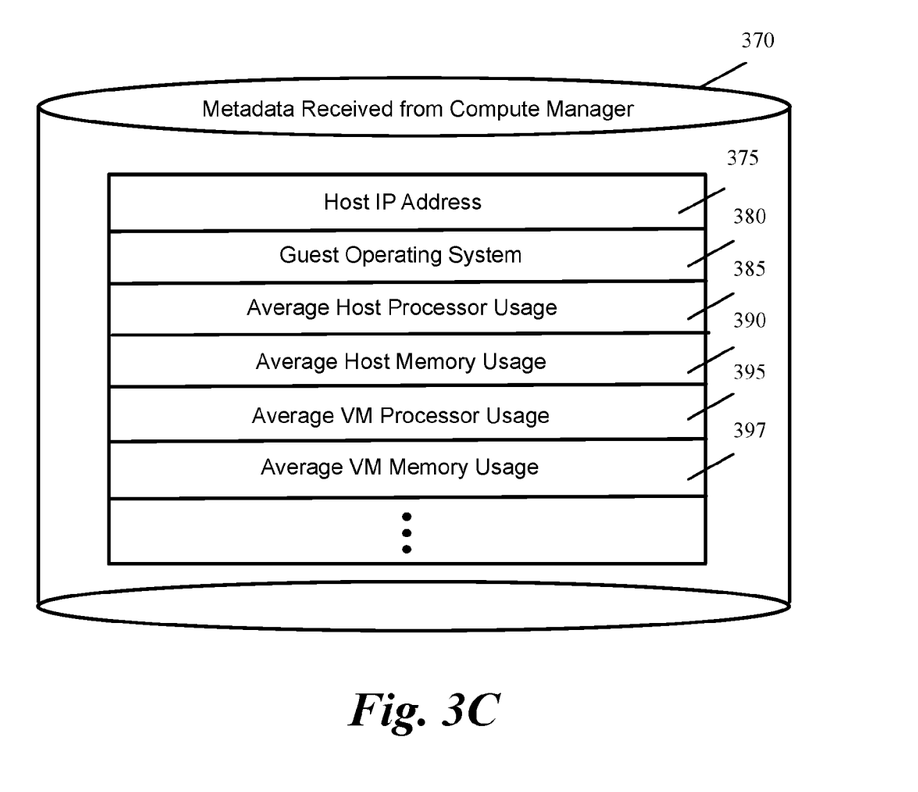
FIG. 3C conceptually illustrates examples of different context metadata that are received from the datacenter compute manager in some embodiments.

FIG. 3B conceptually illustrates examples of different context metadata 345 that are received from the host in some embodiments. As shown, the context metadata 345 that is maintained by the host and is used to enhance the logs include VM processor usage 350, VM memory usage 355, host processor usage 360, host memory usage 365, etc.

Another source of context metadata used by service VM to enhance log packets is the datacenter compute manager 270 (shown in FIG. 2), which configures and manages hosts and VMs in the datacenter. The datacenter compute manager maintains a set of context metadata such as the host Internet protocol (IP) address or the guest operating system used by each VM. The service VM 230 in some embodiments queries the datacenter compute manager for the context metadata and associates the context metadata to log packets. The communication between the service VM 230 and the datacenter compute manager in some embodiments is through the MFE 260, one of the uplinks 241-242, one of the PNICs 251-252, and the network 215.

FIG. 3C conceptually illustrates examples of different context metadata 370 that are received from the datacenter compute manager in some embodiments. As shown, the metadata includes host IP address 375, guest operating system 380, average host processor usage 385, average host memory usage 390, average VM processor usage 395, average VM memory usage 397, etc.

Since querying the datacenter compute manager 270 for each log packet is time consuming, the service VM caches (e.g., in cache 290 shown in FIG. 2) the metadata for individual virtual machines and reuses the cached metadata in augmenting logs coming from the same virtual machine. The service VM, therefore, does not have to re-query the datacenter compute manager every time the service VM receives a new log.

Instead, the service VM only queries datacenter compute manager for static data (such as host IP address and guest operating system) when a VM sends a log packet for the first time. In alternative embodiments, the service VM queries the datacenter compute manager for all configured VMs' static metadata and caches them at once. In these embodiments, the datacenter compute manager is queried for VM metadata only when a new VM is configured on the host. The changing metadata such as average processor and memory usage is also periodically queried (e.g., at predetermined time intervals) from the datacenter compute manager and is cached to enhance log packets that are received during that time interval.

C. Using a Logging Process to Collect Logs and Add Context Metadata to the Logs

Figure 4:
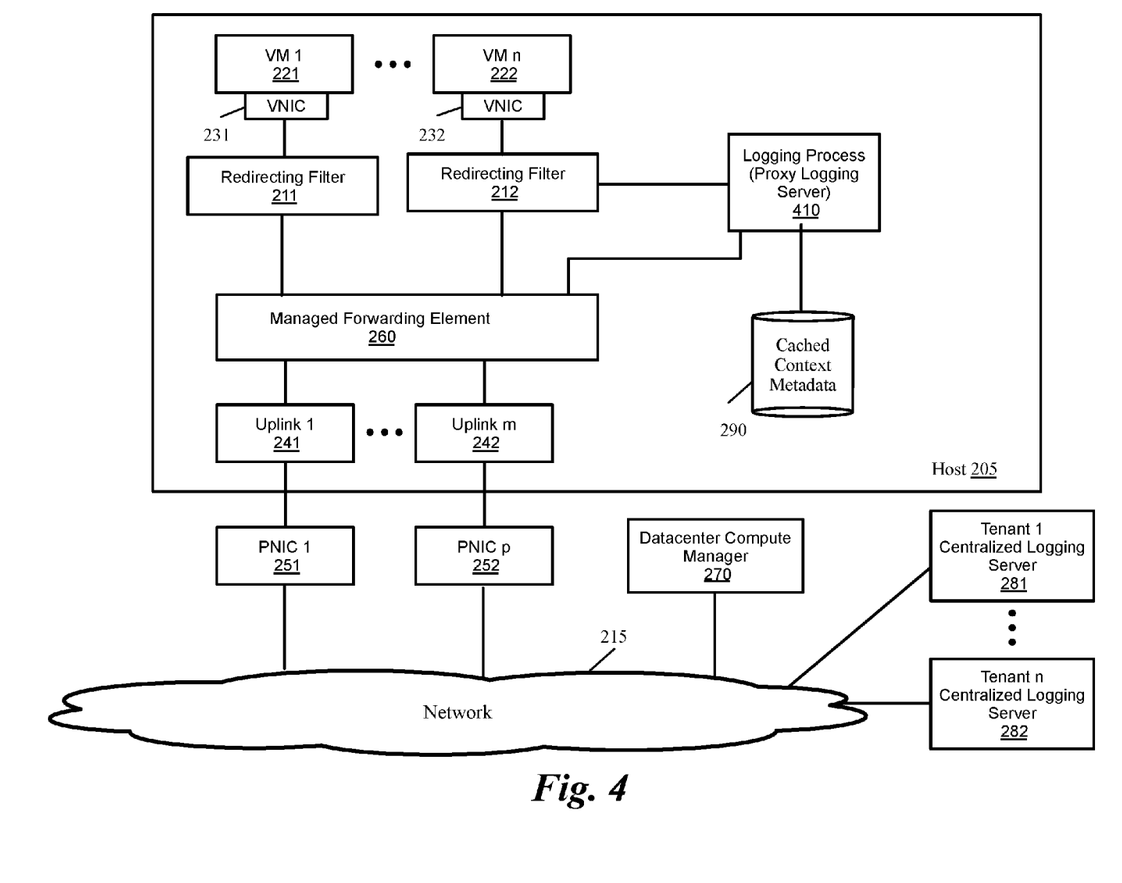
FIG. 4 conceptually illustrates a logging service that uses a filter to intercept packets with log data and sends the packets to a user controlled process in some embodiments.

FIG. 4 conceptually illustrates a logging service that uses a filter to intercept packets with log data and send the packets to a logging process in some embodiments. One difference between the embodiment described by reference to in FIG. 2 and the alternative embodiment in FIG. 4 is using a logging process 410 instead of a service VM 230 as the proxy logging server. The logging process 410 in some embodiments is a process that runs on the host operating system. This embodiment removes the overhead of using a service VM, as the logging process can interact with other processes in the host, e.g., through the control plane.

Similar to the embodiment of FIG. 2, the redirecting filter intercepts log packets, adds metadata that is available to the redirecting filter (e.g., the metadata shown in FIG. 3A), and redirects (or copies) the packets and the metadata to the logging process 410.

Similar to the service VM 230, the logging process 410 queries the host to get additional metadata (e.g., the metadata shown in FIG. 3B). Similar to the service VM 230, the logging service 410 also queries the compute manager (either periodically or at the initialization) for context metadata. The logging process 410 caches the context metadata in cache 290 and uses the metadata to enhance the log packets.

In some embodiments, the logging process is configured through a network manager service to support multiple logging server IP addresses for multiple tenants. The logging process collects the log packets generated by the VMs of each tenant and the log packets' associated metadata and periodically sends the log packets in bulk (e.g., after a predetermined period of time and/or after a predetermined amount of log is collected) to each tenant's corresponding centralized logging server 281-282.

D. Examples of Enhancing of Logs with Metadata

Figure 5:
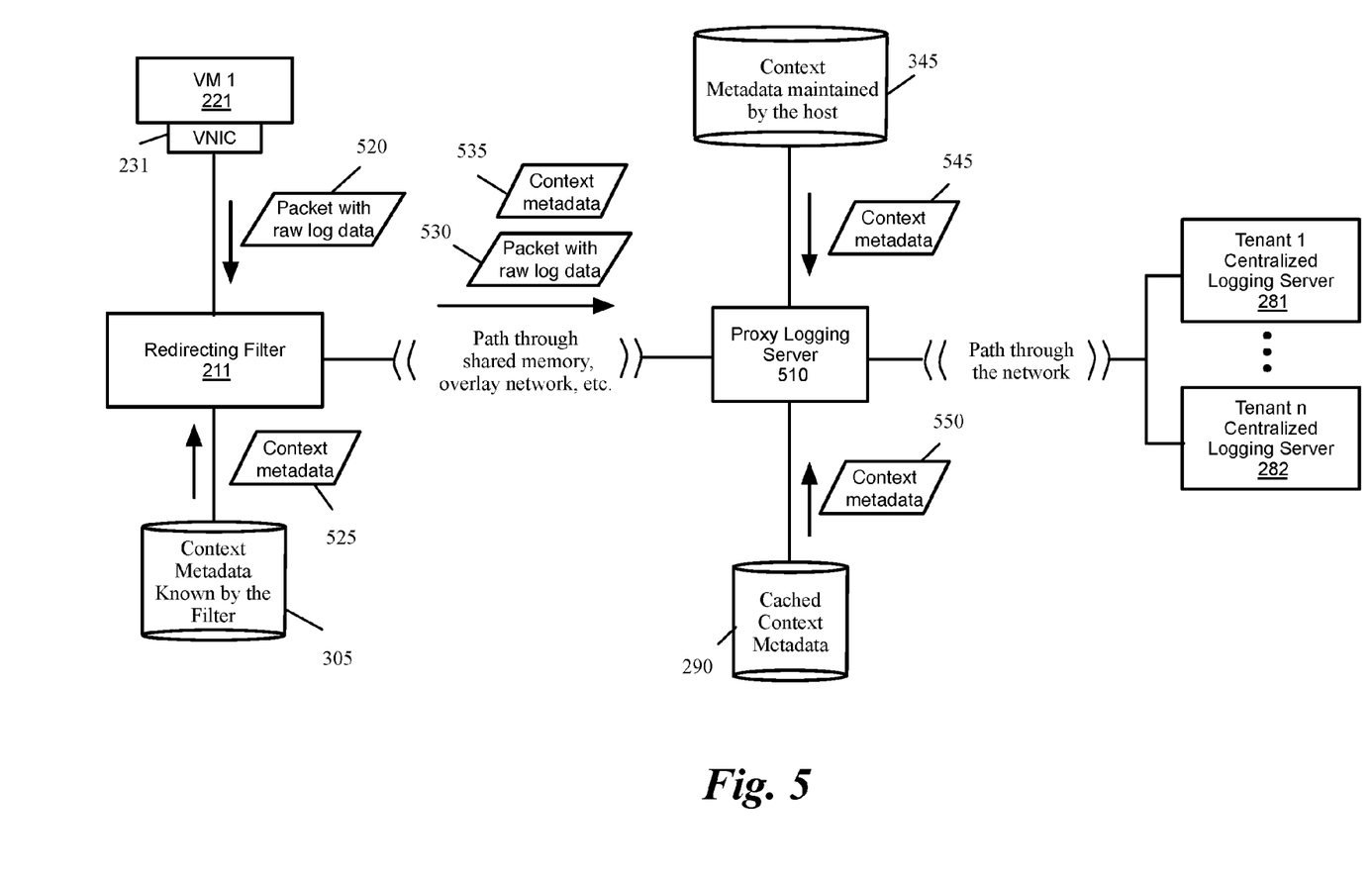
FIG. 5 conceptually illustrates enhancing a log packet with context metadata by the redirecting filter and a proxy logging server in some embodiments.

FIG. 5 conceptually illustrates enhancing a log packet with context metadata by the redirecting filter and the proxy logging server in some embodiments. The proxy logging server 510 can be a service VM (such as service VM 230 in FIG. 2) or a logging process (such as logging process 410 in FIG. 4). For simplicity other components of FIGS. 2 and 4 such as the MFE, the network, etc., are not shown in FIG. 5.

As shown, the redirecting filter 211 intercepts log packets 520 that are sent by a VM 221 (e.g., packets that are sent to a logging port such as the syslog port). The redirecting filter identifies context metadata 525 for the packet from the context metadata 305 that is known to the redirecting filter (e.g., context metadata in FIG. 3A). The redirecting filter 211 then redirects the packet (or sends a copy of the packet) 530 and the associated context metadata 535 to the proxy logging server 510.

The proxy logging server 510 also identifies additional context metadata for the log packets. As shown, the proxy sever 510 gets context metadata 545 from the host (e.g., metadata 370 shown in FIG. 3B) as described above by reference to FIG. 2 to further enhance the metadata for the log packets.

The proxy logging server also gets context metadata 550 (e.g., metadata 345 shown in FIG. 3C) from the cached context metadata 290, which is received from datacenter compute manager 270 (shown in FIGS. 2 and 4) either periodically or at initialization time of the VM to further enhance the metadata for the log packets. The proxy logging server collects the log packets for each tenant and after a predetermined amount of time or after a predetermined amount of log packets are collected, sends the log packets in bulk to the tenants' centralized logging servers 281-282.

The proxy logging server in some embodiments redacts confidential data such as passwords for the logs before the logs are sent out of the host. The proxy logging server also compresses and encrypts the log packets to provide speed and security for transmitting the logs to centralized logging servers outside the host.

The proxy logging server in some embodiments associates different types of metadata context to a log packet based on different log levels/types (such as error or debug) present in the log packet. For instance, if a log packet is related to an error condition, the associated metadata is made verbose to provide critical context such as processor, memory, disk space etc. On the other hand, the proxy logging server may associate different metadata to a log packet that is related to debugging to provide information appropriate for debugging purposes. The proxy logging server in some embodiments utilizes a set of client-configured rules to parse the log packets in order to filter the verbose log messages and/or to associate additional metadata for different log levels/types.

Figure 6:
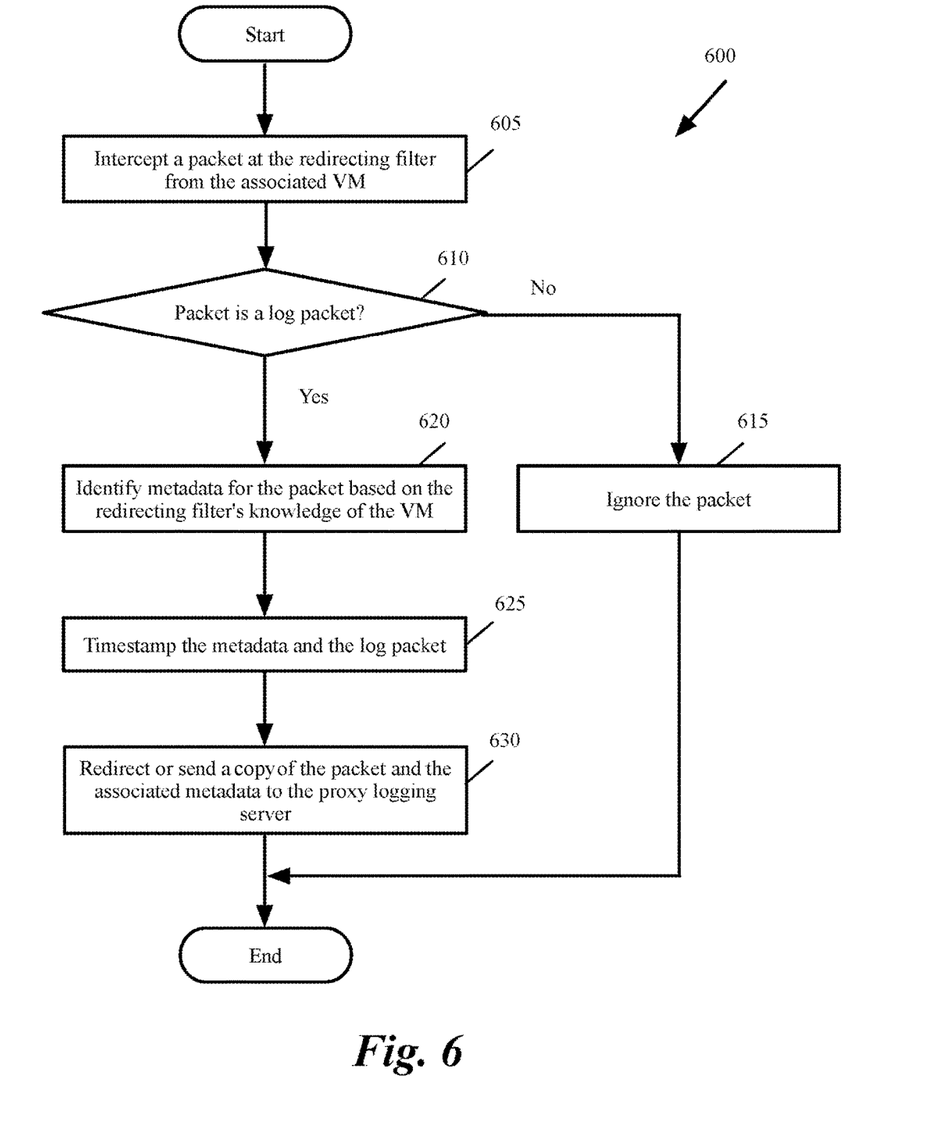
FIG. 6 conceptually illustrates a process for intercepting a log packet and redirecting or sending the packet along with a set of metadata to a proxy logging server in some embodiments.

FIG. 6 conceptually illustrates a process 600 for intercepting a log packet and redirecting or sending the log packet along with a set of metadata to a proxy logging server in some embodiments. The process in some embodiments is performed by a redirecting server such as redirecting server 221 or 222 described above.

As shown, the process intercepts (at 605) a packet at the redirecting filter from a VM associated with the redirecting filter. For instance, the process receives packet 520 with raw log data from VM 221 as described above by reference to FIG. 5. The packet in some embodiments is intercepted when the packet is sent from the VM to an MFE.

The process then determines (at 610) whether the packet is a log packet. For instance, the process determines the packet is a log packet when the packet is sent to a logging port such as syslog port. If the packet is not a log packet, the process ignores (at 615) the packet. The process then ends.

Otherwise, the process identifies metadata for the packet based on the redirecting filter's knowledge of the VM. For instance, the redirecting filter is configured to intercept packets from a particular tenant or is configured to listen to a particular logging port. The redirecting filter is aware of context metadata such as VM name, VM UUID, VM IP address (e.g., as described above by reference to FIG. 3A).

The process also timestamps (at 625) the metadata and/or the log packet. The process then redirects or sends a copy of the packet and the associated metadata to the proxy logging server. For instance, the process sends packer 530 and context metadata 535 to proxy logging server 510 as shown in FIG. 5. The process then ends.

Figure 7:
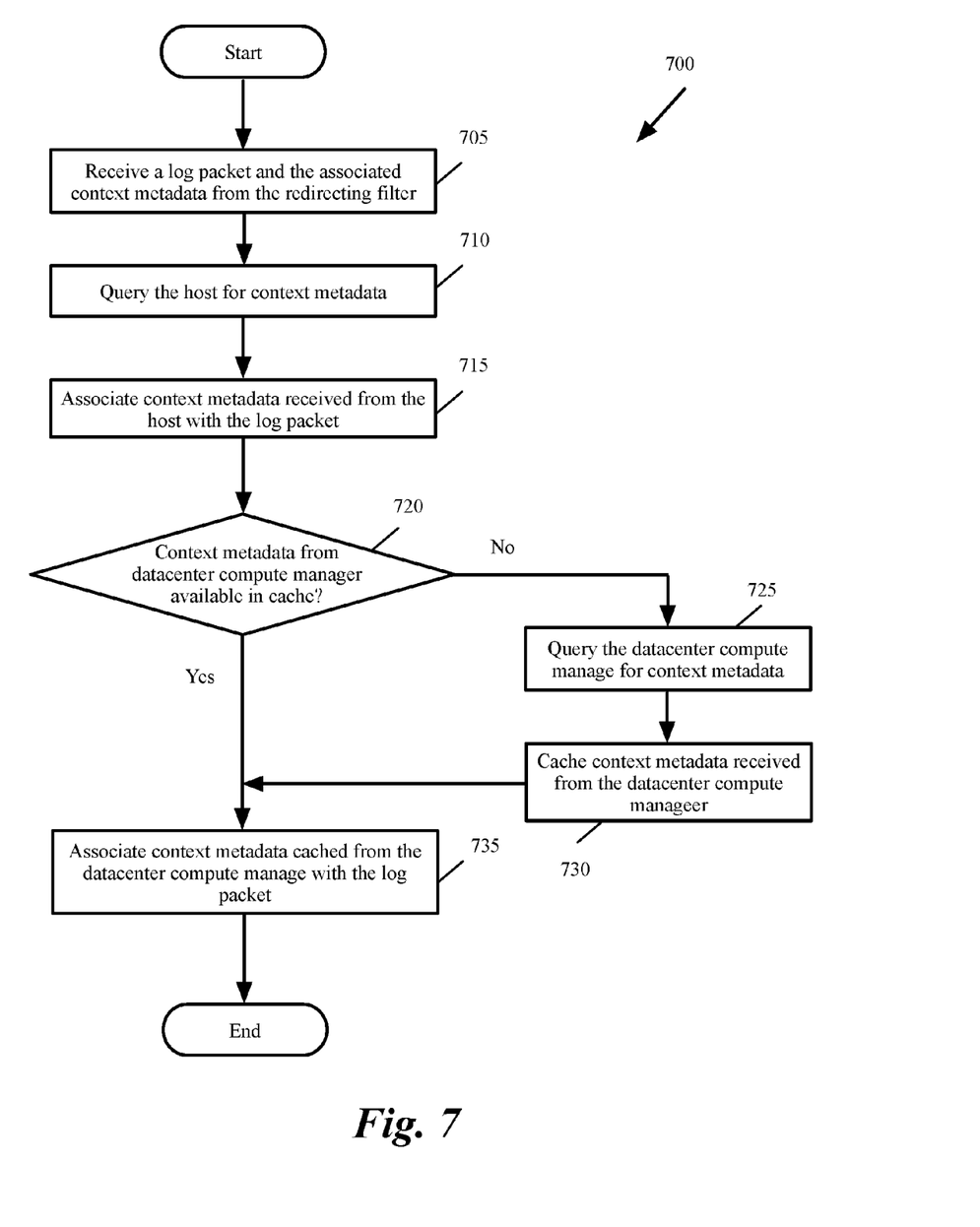
FIG. 7 conceptually illustrates a process for collecting log packets and the associated metadata and further enhancing the context metadata in some embodiments.

FIG. 7 conceptually illustrates a process 700 for collecting log packets and the associated metadata and further enhancing the context metadata in some embodiments. The process in some embodiments is performed by a proxy logging server such as proxy logging servers 230, 410, or 510 shown in FIGS. 3-5.

As shown, the process receives (at 705) a log packet and the associated context metadata from the redirecting filter. The process then queries (at 710) the host for additional context metadata. For instance, the process queries the host for context metadata 545 as described above by reference to FIG. 5. The process then associates (at 715) the context metadata received from the host with the log packet.

The process then determines (at 720) whether context metadata from the datacenter compute manager is available in cache. For instance, the process determines whether static context metadata has already been received from the compute sever and cached. The process also determines whether dynamic metadata has already been received from the compute sever and cached within a predetermined amount of time.

If context metadata from the datacenter compute manager is available in cache, the process proceeds to 735, which is described below. Otherwise, the process queries (at 725) the datacenter compute manager for context metadata. For instance, the process queries datacenter compute manager 270 as described above by reference to FIGS. 2 and 5.

The process then caches (at 730) context metadata received from the datacenter compute manager. For instance, the process stores the context metadata in cache 290 shown in FIGS. 2, 4, and 5. The process then associates (at 735) context metadata cached from the datacenter compute manager with the log packet. The process in some embodiments associates different types of metadata context to a log packet based on different log levels/types (such as error or debug) present in the log packet. For instance, if a log packet is related to an error condition, the associated metadata is made verbose to provide critical context such as processor, memory, disk space etc. On the other hand, the process may associate different metadata to a log packet that is related to debugging to provide information appropriate for debugging purposes. The process in some embodiments utilizes a set of client-configured rules to parse the log packets in order to filter the verbose log messages and/or to associate additional metadata for different log levels/types. The process then ends.

Figure 8:
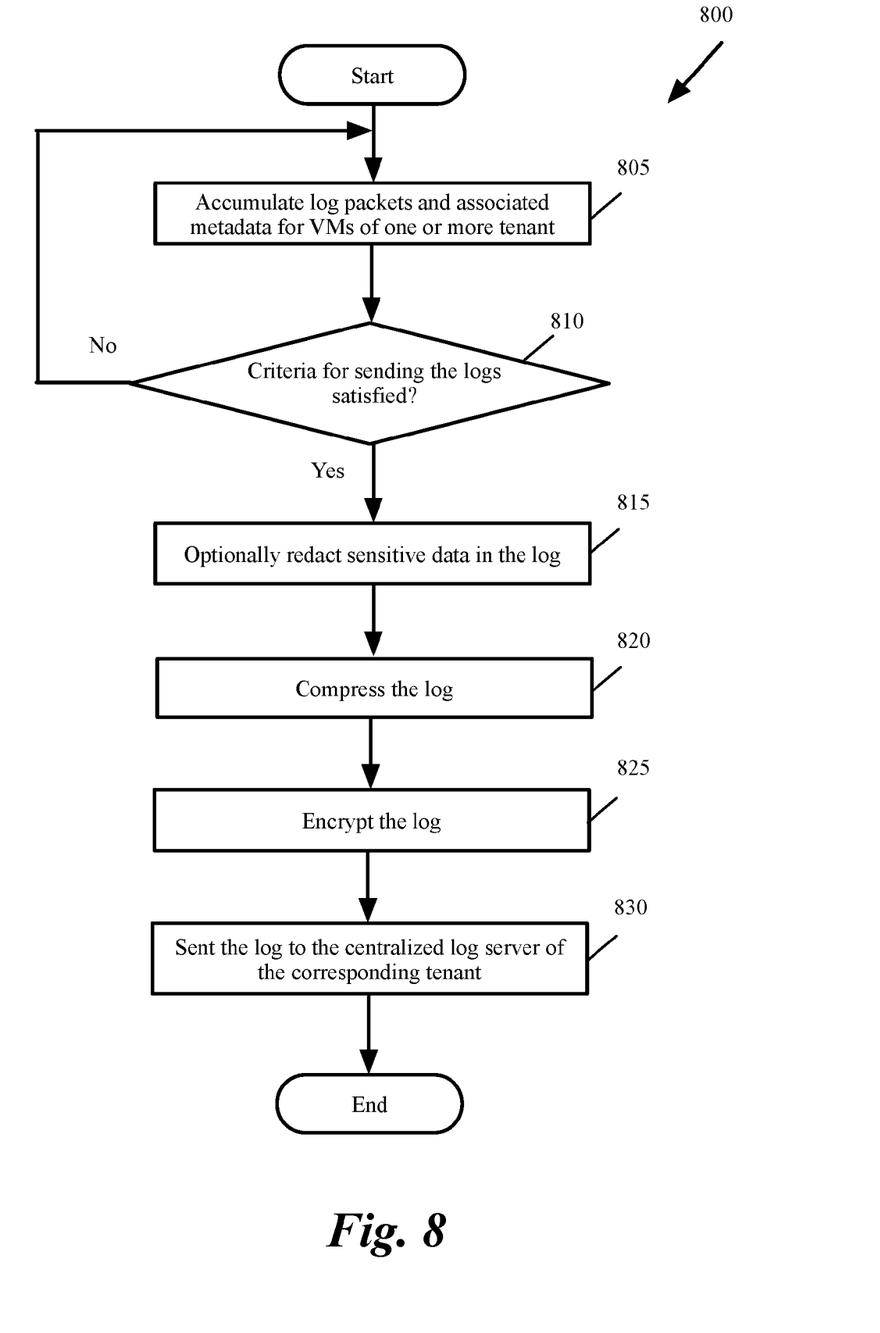
FIG. 8 conceptually illustrates a process for sending log packets to a central logging server in some embodiments.

FIG. 8 conceptually illustrates a process 800 for sending log packets to a central logging server in some embodiments. The process is performed by a proxy logging server such as proxy logging server 230, 410, or 510 described above.

As shown, the process accumulates (at 805) log packets and associated metadata for VMs of one or more tenants. The process in some embodiments stores the logs of each tenant in separate storage locations. The process then determines (at 810) whether a set of criteria for sending the logs to a central logging server is satisfied. For instance, the process determines whether a predetermined amount of time is passed for the last time the logs are sent or a predetermined amount of log has been accumulated. If not, the process proceeds to 805, which was described above.

Otherwise, the process optionally redacts (at 815) sensitive data such as passwords and other sensitive data in the logs prior to sending the logs out of the host. The process then compresses (at 820) the logs. The process then encrypts (at 825) the logged packets. The process then sends (at 830) the logs to the centralized log server of the corresponding tenant. The process then ends.

In addition to providing a uniform way of identifying and attaching metadata to the log packets, several other benefits are provided by the disclosed embodiments. For instance, parsing the log messages at the source by using the spare capacity of the host machines reduces the need for powerful dedicated log servers. Filtering verbose messages at the source based on client-configured rules and providing buffering and compression capabilities at the source reduces the lossy characteristic of the packet traffic. Metadata information (such as processor and memory usage) that are critical to the functioning of the servers or applications that generate the logs are immediately correlated at the source with the generated logs rather than trying to match the information received around the same timeline at a central logging service from different logging sources as is typical in the prior art.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
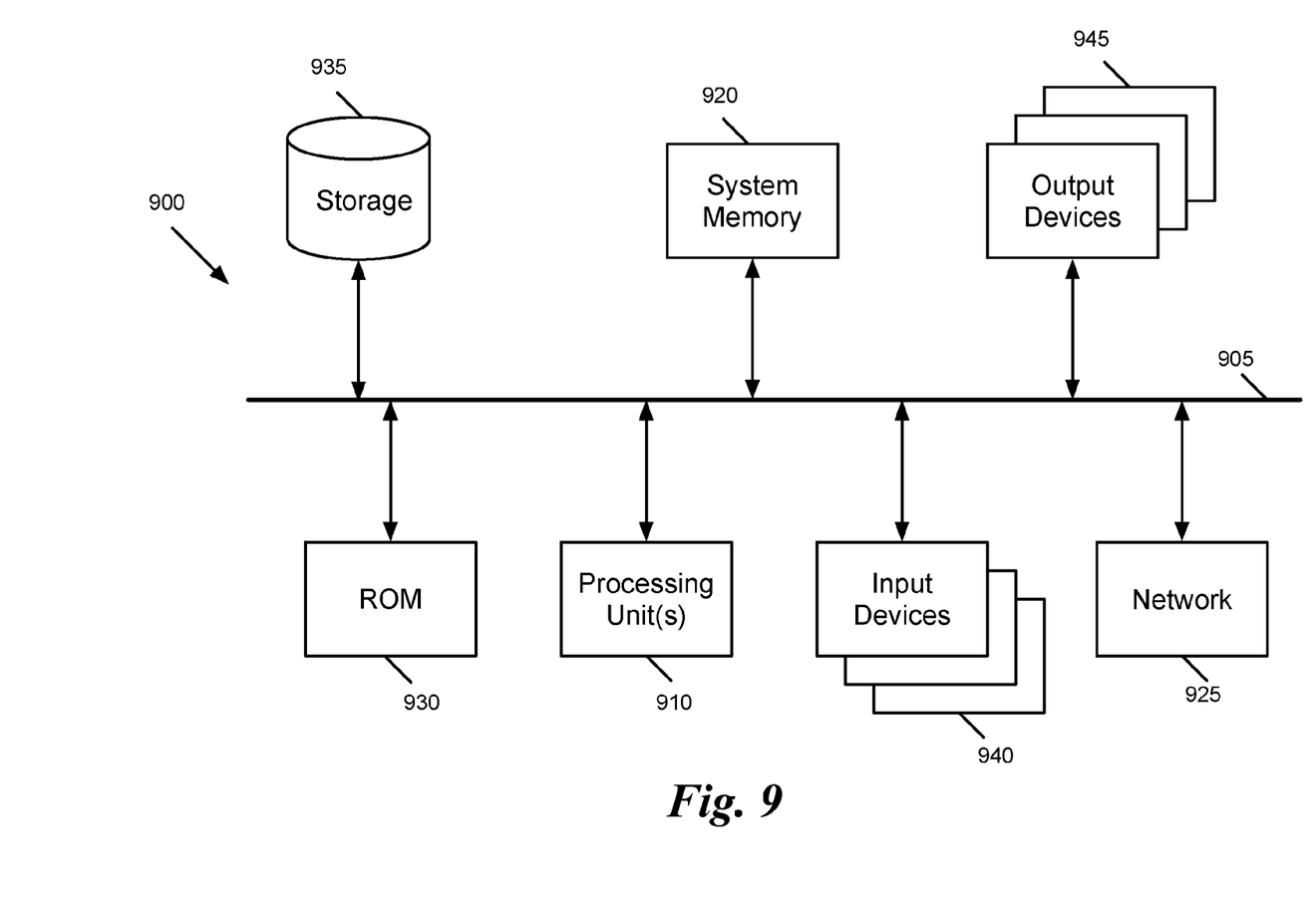
FIG. 9 conceptually illustrates an electronic system with which some embodiments of the invention are implemented.

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 920, a read-only memory (ROM) 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 920, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 920 is a read-and-write memory device. However, unlike storage device 935, the system memory is a volatile read-and-write memory, such as random access memory. The system memory stores some of the instructions and data that the processor needs at runtime. In some embodiments, the invention's processes are stored in the system memory 920, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 6-8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of enhancing log packets with context metadata at a proxy logging server, the method comprising:
  receiving, from a redirecting filter on a host in a datacenter (i) a log packet intercepted by the redirecting filter from a data compute node (DCN) of a datacenter tenant and (ii) a first set of context metadata associated with the log packet and comprising characteristics of the DCN from which the log packet was sent;
  associating a second set of context metadata with the log packet, the second set of context metadata received from a compute manager of the datacenter and comprising dynamic host resource usage information; and
  sending the log packet with the first and second sets of context metadata to a central logging server associated with the tenant.

2. The method of claim 1 further comprising associating a third set of context metadata with the log packet, the third set of context metadata received by the proxy logging server from the host and comprising DCN resource usage information, wherein the third set of context metadata is sent with the log packet and the first and second sets of context metadata from the proxy logging server to the central logging server associated with the tenant.

3. The method of claim 1, wherein the second set of context metadata received from the compute manager is cached in the host, wherein associating the second set of context metadata with the log packet comprises associating the cached second set of context metadata with the log packet.

4. The method of claim 1 further comprising redacting a set of confidential information in the log packet at the proxy logging server prior to sending the packet to the central logging server.

5. The method of claim 1 further comprising:
  accumulating a plurality of log packets at the proxy logging server;
  compressing the plurality of log packets; and
  encrypting the compressed plurality of log packets.

6. The method of claim 5, wherein sending the packet from the proxy logging server to the central logging server comprises sending the encrypted and compressed plurality of log packets to the central logging server in bulk.

7. The method of claim 1, wherein the DCN is a virtual machine.

8. A non-transitory machine readable medium storing a program which when executed by at least one processing unit enhances log packets with context metadata at a proxy logging server, the program comprising sets of instructions for:
  receiving, from a redirecting filter on a host in a datacenter, (i) a log packet intercepted by the redirecting filter from a data compute node (DCN) of a datacenter tenant and (ii) a first set of context metadata associated with the log packet and comprising characteristics of the DCN from which the packet was sent;
  associating a second set of context metadata with the log packet, the second set of context metadata received from a compute manager of the datacenter and comprising dynamic host resource usage information; and
  sending the log packet with the first and second sets of context metadata to a central logging server associated with the tenant.

9. The non-transitory machine readable medium of claim 8, wherein the program further comprises a set of instructions for associating a third set of context metadata with the log packet, the third set of context metadata received by the proxy logging server from the host and comprising DCN resource usage information, wherein the third set of context metadata is sent with the log packet and the first and second sets of context metadata from the proxy logging server to the central logging server associated with the tenant.

10. The non-transitory machine readable medium of claim 8, wherein the second set of context metadata received from the compute manager is cached in the host, wherein the set of instructions for associating the second set of context metadata with the log packet comprises a set of instructions for associating the cached second set of context metadata with the log packet.

11. The non-transitory machine readable medium of claim 8, wherein the program further comprises a set of instructions for redacting a set of confidential information in the log packet at the proxy logging server prior to sending the packet to the central logging server.

12. The non-transitory machine readable medium of claim 8, wherein the program further comprises sets of instructions for:
  accumulating a plurality of log packets at the proxy logging server;
  compressing the plurality of log packets; and
  encrypting the compressed plurality of log packets.

13. The non-transitory machine readable medium of claim 12, wherein the set of instructions for sending the packet from the proxy logging server to the central logging server comprises a set of instructions for sending the encrypted and compressed plurality of log packets to the central logging server in bulk.

14. The non-transitory machine readable medium of claim 8, wherein the DCN is a virtual machine.

15. A system comprising:
  a set of processing units; and
  a non-transitory machine readable medium storing a program which when executed by at least one of the processing units enhances log packets with context metadata at a proxy logging server, the program comprising sets of instructions for:
    receiving, from a redirecting filter on a host in a datacenter, (i) a log packet intercepted by the redirecting filter from a data compute node (DCN) of a datacenter tenant and (ii) a first set of context metadata associated with the log packet and comprising characteristics of the DCN from which the packet was sent;
    associating a second set of context metadata with the log packet, the second set of context metadata received from a compute manager of the datacenter and comprising dynamic host resource usage information; and
    sending the log packet with the first and second sets of context metadata to a central logging server associated with the tenant.

16. The system of claim 15, wherein the program further comprises a set of instructions for associating a third set of context metadata with the log packet, the third set of context metadata received by the proxy logging server from the host and comprising DCN resource usage information, wherein the third set of context metadata is sent with the log packet and the first and second sets of context metadata from the proxy logging server to the central logging server associated with the tenant.

17. The system of claim 15, wherein the second set of context metadata received from the compute manager is cached in the host, wherein the set of instructions for associating the second set of context metadata with the log packet comprises a set of instructions for associating the cached second set of context metadata with the log packet.

18. The system of claim 15, wherein the program further comprises a set of instructions for redacting a set of confidential information in the log packet at the proxy logging server prior to sending the packet to the central logging server.

19. The system of claim 15, the program further comprising sets of instructions for:
 accumulating a plurality of log packets at the proxy logging server;
 compressing the plurality of log packets; and
 encrypting the compressed plurality of log packets.

20. The system of claim 19, wherein the set of instructions for sending the packet from the proxy logging server to the central logging server comprises a set of instructions for sending the encrypted and compressed plurality of log packets to the central logging server in bulk.

21. The system of claim 15, wherein the DCN is a virtual machine.

* * * * *